US012389213B1

(12) United States Patent
Deckard et al.

(10) Patent No.: US 12,389,213 B1
(45) Date of Patent: Aug. 12, 2025

(54) ROUTING EMERGENCY CELLULAR COMMUNICATIONS AND ASSOCIATED DETECTED LOCATION INFORMATION USING ORBITAL BASE STATIONS

(71) Applicant: Lynk Global, Inc., Falls Church, VA (US)

(72) Inventors: Margo Ruth Deckard, Arlington, VA (US); Mahmoud Khafagy, Fairfax, VA (US); Tyghe Robert Speidel, New York, NY (US)

(73) Assignee: Lynk Global, Inc., Falls Church, VA (US)

( * ) Notice: Subject to any disclaimer, the term of this patent is extended or adjusted under 35 U.S.C. 154(b) by 369 days.

(21) Appl. No.: 17/689,893

(22) Filed: Mar. 8, 2022

Related U.S. Application Data (60) Provisional application No. 63/157,947, filed on Mar. 8, 2021.

(51) Int. Cl.
| | | |
|---|---|---|
| *H04W 4/90* | (2018.01) | |
| *G01S 19/46* | (2010.01) | |
| *H04B 7/01* | (2006.01) | |
| *H04W 4/029* | (2018.01) | |
| *H04W 84/06* | (2009.01) | |

(52) U.S. Cl.
CPC ............... *H04W 4/90* (2018.02); *G01S 19/46* (2013.01); *H04B 7/01* (2013.01); *H04W 4/029* (2018.02); *H04W 84/06* (2013.01)

(58) Field of Classification Search
CPC ......... H04W 4/90; H04W 4/029; G01S 16/46; H04B 7/01

USPC ...................................................... 455/404.1
See application file for complete search history.

(56) References Cited

U.S. PATENT DOCUMENTS

| | | | |
|---|---|---|---|
| 3,349,398 | A | 10/1967 | Werth |
| 4,218,654 | A | 8/1980 | Ogawa et al. |
| 5,467,345 | A | 11/1995 | Cutler, Jr. et al. |
| 5,642,355 | A | 6/1997 | Smith |
| 5,740,164 | A | 4/1998 | Liron |
| 5,841,766 | A | 11/1998 | Dent et al. |

(Continued)

FOREIGN PATENT DOCUMENTS

| | | |
|---|---|---|
| AU | 714923 | 1/2000 |
| AU | 2016347539 A1 | 6/2018 |

(Continued)

OTHER PUBLICATIONS

Hemmati, Hamid "Laser communications: From terrestrial broadband to deep-space" 2014 16th International Conference on TransparentOptiocal Networks (ICTON) IEEE, 2014.

(Continued)

*Primary Examiner* — Maria El-Zoobi
(74) *Attorney, Agent, or Firm* — Haynes and Boone, LLP (57) ABSTRACT

Determining the location of a device communicating an emergency call to an emergency call center via an orbital base station, wherein the device is located outside of a terrestrial network coverage region, can comprise determining a Doppler shift from a signal received from the device, determining a signal time delay of the signal received from the device, determining a location of the orbital base station, and computing a geolocation of the device based on the Doppler shift, the signal time delay, and the location of the orbital base station.

21 Claims, 3 Drawing Sheets

(56) References Cited

U.S. PATENT DOCUMENTS

| | | | |
|---|---|---|---|
| 5,943,324 A | 8/1999 | Ramesh et al. |
| 5,978,653 A | 11/1999 | Taylor et al. |
| 5,991,598 A | 11/1999 | Nawata |
| 6,008,758 A | 12/1999 | Campbell |
| 6,031,826 A | 2/2000 | Hassan |
| 6,084,865 A | 7/2000 | Dent |
| 6,101,177 A | 8/2000 | Bodin et al. |
| 6,157,621 A | 12/2000 | Brown et al. |
| 6,204,808 B1 | 3/2001 | Bloebaum et al. |
| 6,272,325 B1 | 8/2001 | Wiedeman et al. |
| 6,404,769 B1 | 6/2002 | Kapoor |
| 6,493,322 B1 | 12/2002 | Chennakeshu et al. |
| 6,553,225 B1 | 4/2003 | Zhao et al. |
| 6,606,309 B1 | 8/2003 | Wang |
| 7,257,371 B1 | 8/2007 | Bettinger et al. |
| 7,358,899 B1 | 4/2008 | Ville |
| 7,471,720 B2 | 12/2008 | Ram et al. |
| 7,502,382 B1 | 3/2009 | Liu et al. |
| 7,515,566 B2 | 4/2009 | Dale et al. |
| 7,574,224 B2 | 8/2009 | Lane |
| 7,792,488 B2 | 9/2010 | Karabinis et al. |
| 8,078,101 B2 | 12/2011 | Karabinis et al. |
| 8,223,069 B2 | 7/2012 | Wang et al. |
| 8,538,327 B2 | 9/2013 | Sayeed et al. |
| 8,665,771 B2 | 3/2014 | Nam et al. |
| 8,705,436 B2 | 4/2014 | Dutta |
| 9,042,408 B2 | 5/2015 | Gaal et al. |
| 9,184,829 B2 | 11/2015 | Miller et al. |
| 9,188,429 B2 | 11/2015 | Miller et al. |
| 9,628,956 B1 | 4/2017 | Kim |
| 9,788,306 B2 | 10/2017 | Chen et al. |
| 9,900,856 B2 | 2/2018 | Wu et al. |
| 9,954,601 B2 | 4/2018 | Buer et al. |
| 9,973,266 B1 | 5/2018 | Avellan et al. |
| 10,084,535 B1 | 9/2018 | Speidel |
| 10,742,311 B2 | 8/2020 | Speidel et al. |
| 11,522,604 B2 | 12/2022 | Speidel et al. |
| 11,595,114 B2* | 2/2023 | Speidel ............... H04B 7/01 |
| 2001/0022779 A1 | 9/2001 | Wheatley et al. |
| 2002/0060995 A1 | 5/2002 | Cervello et al. |
| 2002/0151273 A1 | 10/2002 | Marko |
| 2002/0164986 A1 | 11/2002 | Briand et al. |
| 2002/0177403 A1 | 11/2002 | LaPadre et al. |
| 2003/0028339 A1 | 2/2003 | Caso et al. |
| 2004/0192197 A1 | 9/2004 | Capots et al. |
| 2004/0192201 A1 | 9/2004 | Febvre et al. |
| 2005/0143005 A1 | 6/2005 | Moore |
| 2006/0246913 A1 | 11/2006 | Merboth et al. |
| 2006/0285481 A1 | 12/2006 | Lane et al. |
| 2007/0078541 A1 | 4/2007 | Rogers |
| 2007/0155316 A1 | 7/2007 | Monte et al. |
| 2007/0184778 A1 | 8/2007 | Mechaley, Jr. |
| 2007/0218931 A1 | 9/2007 | Beadle et al. |
| 2008/0143589 A1 | 6/2008 | Dankberg et al. |
| 2008/0311844 A1 | 12/2008 | Eidenschink |
| 2009/0205041 A1* | 8/2009 | Michalske ........ H04M 1/72424 |
| | | 715/764 |
| 2009/0309787 A1* | 12/2009 | Gildea ............... G01C 21/3641 |
| | | 342/357.31 |
| 2010/0099375 A1 | 4/2010 | Rowitch |
| 2010/0220780 A1 | 9/2010 | Peng et al. |
| 2010/0220782 A1 | 9/2010 | Peng et al. |
| 2010/0322337 A1 | 12/2010 | Yitalo et al. |
| 2011/0013678 A1 | 1/2011 | Smith et al. |
| 2011/0135043 A1 | 6/2011 | Downey et al. |
| 2012/0302160 A1 | 11/2012 | Silny et al. |
| 2013/0203373 A1* | 8/2013 | Edge ..................... H04W 4/12 |
| | | 455/404.1 |
| 2014/0105054 A1 | 4/2014 | Saegrov et al. |
| 2015/0103723 A1 | 4/2015 | Kim et al. |
| 2015/0146631 A1 | 5/2015 | Kim et al. |
| 2016/0037434 A1 | 2/2016 | Gopal et al. |
| 2016/0080072 A1 | 3/2016 | Baudoin et al. |
| 2016/0205560 A1 | 7/2016 | Hyslop et al. |
| 2017/0195040 A1 | 7/2017 | Sobhani et al. |
| 2017/0324465 A1 | 11/2017 | Sotom et al. |
| 2018/0020205 A1 | 1/2018 | Aflalo et al. |
| 2018/0020778 A1 | 1/2018 | Elder et al. |
| 2018/0022474 A1 | 1/2018 | Meek |
| 2018/0034538 A1 | 2/2018 | Baudoin et al. |
| 2018/0069651 A1 | 3/2018 | Davydov et al. |
| 2018/0138968 A1 | 5/2018 | Auer |
| 2018/0254824 A1 | 9/2018 | Speidel et al. |
| 2018/0254825 A1 | 9/2018 | Speidel et al. |
| 2020/0006761 A1 | 1/2020 | Siomina |
| 2020/0067661 A1 | 2/2020 | Siomina et al. |
| 2020/0068446 A1* | 2/2020 | Nimbavikar ........ H04L 67/306 |
| 2021/0084480 A1* | 3/2021 | Maier ................. H04W 4/90 |
| 2021/0297147 A1* | 9/2021 | Qaise ................. H04W 84/06 |
| 2021/0311203 A1* | 10/2021 | Reis ................... G01S 19/38 |
| 2022/0021446 A1 | 1/2022 | Speidel et al. |
| 2022/0046424 A1* | 2/2022 | Edge ................. H04W 48/04 |
| 2023/0224691 A1* | 7/2023 | Xing ................. H04W 8/183 |
| | | 370/329 |
| 2023/0268989 A1 | 8/2023 | Speidel et al. |

FOREIGN PATENT DOCUMENTS

| | | |
|---|---|---|
| CN | 1346219 A | 4/2002 |
| CN | 101124742 A | 2/2008 |
| CN | 101166360 A | 4/2008 |
| CN | 101455012 A | 6/2009 |
| CN | 102307167 A | 1/2012 |
| CN | 103036607 A | 4/2013 |
| EP | 2999136 A1 | 3/2016 |
| JP | H04 207529 A | 7/1992 |
| JP | 2003115827 A | 4/2003 |
| JP | 2003134022 A | 5/2003 |
| JP | 2009526501 A | 7/2009 |
| WO | 2006038992 A1 | 4/2006 |
| WO | 2009043305 A1 | 4/2009 |
| WO | 2016195813 A2 | 12/2016 |
| WO | 2016209332 A2 | 12/2016 |
| WO | 2017072745 A1 | 5/2017 |
| WO | 2017124004 A1 | 7/2017 |

OTHER PUBLICATIONS

International Search Report mailed May 17, 2018, International Patent Application No. PCT/US2018/020205, Filed Feb. 28, 2018.

International Search Report Mailed Nov. 19, 2018, International Patent Application PCT/US2018/020778, Filed Mar. 2, 2018.

Eylem Ekici et al., "A Multicast Routing Algorith for LEO Satellite IP Networks"; IEEE/ACM Transactions on Networking, IEEE/ACM, New York, NY, US, vol. 10, No. 2, Apr. 1, 2022.

Supplementary European Search Report Mailed Nov. 4, 2020, European Application No. 18810437.6 Filed Mar. 2, 2018, 2 Pages.

Coulom et al., "Low Earth Orbit satelitte payload for Personal Communications" 3rd European Conference on Satelitte Communications (ECSC-3), Nov. 2, 1993, 5 Pages.

Radharkrishnan et al., "Survey of Inter-Satelitte Communication for Small Satelitte Systems: Physical Layer to Network Layer View" IEEE Communications Surveys & Tutorials 18(4): 2442-2473, May 9, 2016.

Supplemental European Search Report for EPO Application EP 18 76 1611, date mailed Jun. 28, 2021.

Office Action Issued for Eurasian Patent Application No. 201991901, dated Feb. 12, 2019, 5 pages.

Meulenber et al. "LEO-based optical/microwave terrestrial communications" International Astronautical Federation—59th International Astronautical Congress 2008, IAC 2008.

Search Report Issued for Eurasian Patent Application No. 202292710, dated Jun. 2, 2023, 3 pages.

Extended European Search Report, Application No. 18761611.5, dated Jun. 28. 2021.

Sidibeh, "Adaptation of the IEEE 802.11 Protocol for Inter-Satellite Link in LEO Satellite Networks", Doctoral Thesis, Apr. 2008, pp. 1-261.

Tian, Y., et al. "Validation and Implementation of Key Technologies for the Application of 5G NR in LEO Satellite Communication", (56) References Cited

OTHER PUBLICATIONS

15th International Conference on Communication Software and Networks (ICCSN). IEEE, 2023 (Year: 2023) [https://ieeexplore.ieee.org/document/10297391].

* cited by examiner

ROUTING EMERGENCY CELLULAR COMMUNICATIONS AND ASSOCIATED DETECTED LOCATION INFORMATION USING ORBITAL BASE STATIONS

CROSS-REFERENCES TO PRIORITY AND RELATED APPLICATIONS

This application is a non-provisional of, and claims the benefit of and priority from, U.S. Provisional Patent Application No. 63/157,947 filed Mar. 8, 2021, entitled "Methodology for Using Space Based Cell Tower for Routing Emergency Communications."

The following applications are related:
1) U.S. Pat. No. 10,084,535, issued Sep. 25, 2018, entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Pat. No. 10,742,311, granted Aug. 11, 2020, entitled "Simplified Inter-Satellite Link Communications Using Orbital Plane Crossing to Optimize Inter-Satellite Data Transfers" (hereinafter "Speidel II"); and
4) U.S. Non-Provisional patent application Ser. No. 17/570,329 filed Jan. 6, 2022, entitled "Satellite Communication System Transmitting Navigation Signals Using a Wide Beam and Data Signals Using a Directive Beam" (hereinafter "Speidel III").

The entire disclosures of applications/patents recited above are hereby incorporated by reference, as if set forth in full in this document, for all purposes.

FIELD

The present disclosure generally relates to methods and apparatus for determining a geographical location for a subscriber or other mobile device users who is placing an emergency call or text or other communication, or is in need of emergency services at a geographical location, and more particularly to using characteristics of signals between an orbital base stations and a mobile device to geolocate and route mobile device communications or information, possibly enhancing other geolocation information.

BACKGROUND

When a person or entity is seeking emergency services, or it has been determined that a person or entity is in need to emergency services, a critical piece of information would be where the emergency services are needed. When a person calls for emergency services from any landline, it is often a simple matter for an emergency services dispatcher to identify a location, such as an address, for the caller as a dispatching software system typically has access to a database mapping a telephone number associated with an emergency call to an address of a telephone service subscriber subscribing under that telephone number. Some individuals might have wearable electronic devices that detect when they are in need of emergency services and again a dispatching software system might have a hold addresses of such individuals and therefore be able to easily identify a geolocation at which the emergency services are needed.

When an emergency call arrives from a mobile device, such as a smartphone, the location of the caller cannot be simply determined by a home address of a cellular service subscriber associated with the mobile device. Likewise, if for example first responders determined that the holder of a particular mobile device is in need of emergency services even in the absence of a call, as might be the case for a kidnap victim or a wandering dementia patient, there is a need to determine a geolocation of the mobile device. A geolocation could be an indication of a terrestrial latitude, terrestrial longitude, and terrestrial altitude, or some equivalent, or information with sufficient resolution to allow for dispatching emergency servicers to the mobile device holder's location.

In a current approach, an emergency call (which can be generalized to include a voice call, a text, a data message, and app API call, etc.) over a terrestrial cellular network would pass through a cell tower the mobile device is near, possibly nearest, and the dispatching software system would be informed of which cell tower is handling the call. The dispatching software system might have access to a database or data that maps cell towers to locations and/or maps cell towers to specific emergency services provider, allowing a dispatcher to route an emergency call quickly to a relevant specific emergency services provider. However, such data might not be frequently updated and thus data might not route calls correctly or correctly identify a location of the mobile device.

In some mobile network operator ("MNO") cellular telecommunications systems, for a call determined to be an emergency call (e.g., an "E-911 call), a Gateway Mobile Location Center ("GMLC") might assign an Emergency Services Routing Key ("ESRK") value for one or more cell towers. The ESRK value is then used to determine the likely relevant emergency services provider and their emergency call center (e.g., Public Safety Answering Point ("PSAP")) to which the call should be routed. In some cases, the location information may not accurately represent the mobile device's location, resulting in the call misrouting to an emergency number call center (e.g., a PSAP) that may not have jurisdiction over the location of the mobile device. The misrouting of the call can delay the deployment of first responders while consuming the time and resources of both the PSAP that initially handles the call and the PSAP to which the call is transferred.

Some jurisdictions have upgraded their emergency communications infrastructure into next-generation infrastructure (e.g., NG-911) to allow for more accurate location tracking. This can require capital expenditure and upgrades from the MNO's networks and thus is not always in place.

Improvements in location of mobile devices and in routing emergency calls or determinations of emergency need at a present location of a mobile device are desirable.

SUMMARY

Determining the location of a device communicating an emergency call to an emergency call center via an orbital base station, wherein the device is located outside of a terrestrial network coverage region, can comprise determining a Doppler shift from a signal received from the device, determining a signal time delay of the signal received from the device, determining a location of the orbital base station, and computing a geolocation of the device based on the Doppler shift, the signal time delay, and the location of the orbital base station.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As explained herein, an emergency call system could use characteristics of signals received at an orbital base station as part of a geolocation process to locate a mobile device from which an emergency call is being made or which is associated with a person or entity known to be in need of emergency assistance. A number of different characteristics of signals might be used, such as a Doppler shift that his presence is present in communications between a mobile device and the orbital base station and/or signal propagation delay of signals between the mobile device and the orbital base station. Such geolocation might be performed with the assistance of data obtained from nearby terrestrial base stations, such as cellular telephone towers, but might be performed when no such terrestrial base stations are available, or where terrestrial base stations are available but they are not able to accurately geolocate the mobile device.

Speidel IV describes some methods of using a constellation of satellites to provide simultaneous communications services and GNSS services that might be used for as part of a process for geolocating a mobile device from which an emergency call is being made and that might be used in combination with methods and apparatus described herein.

Figure 1:
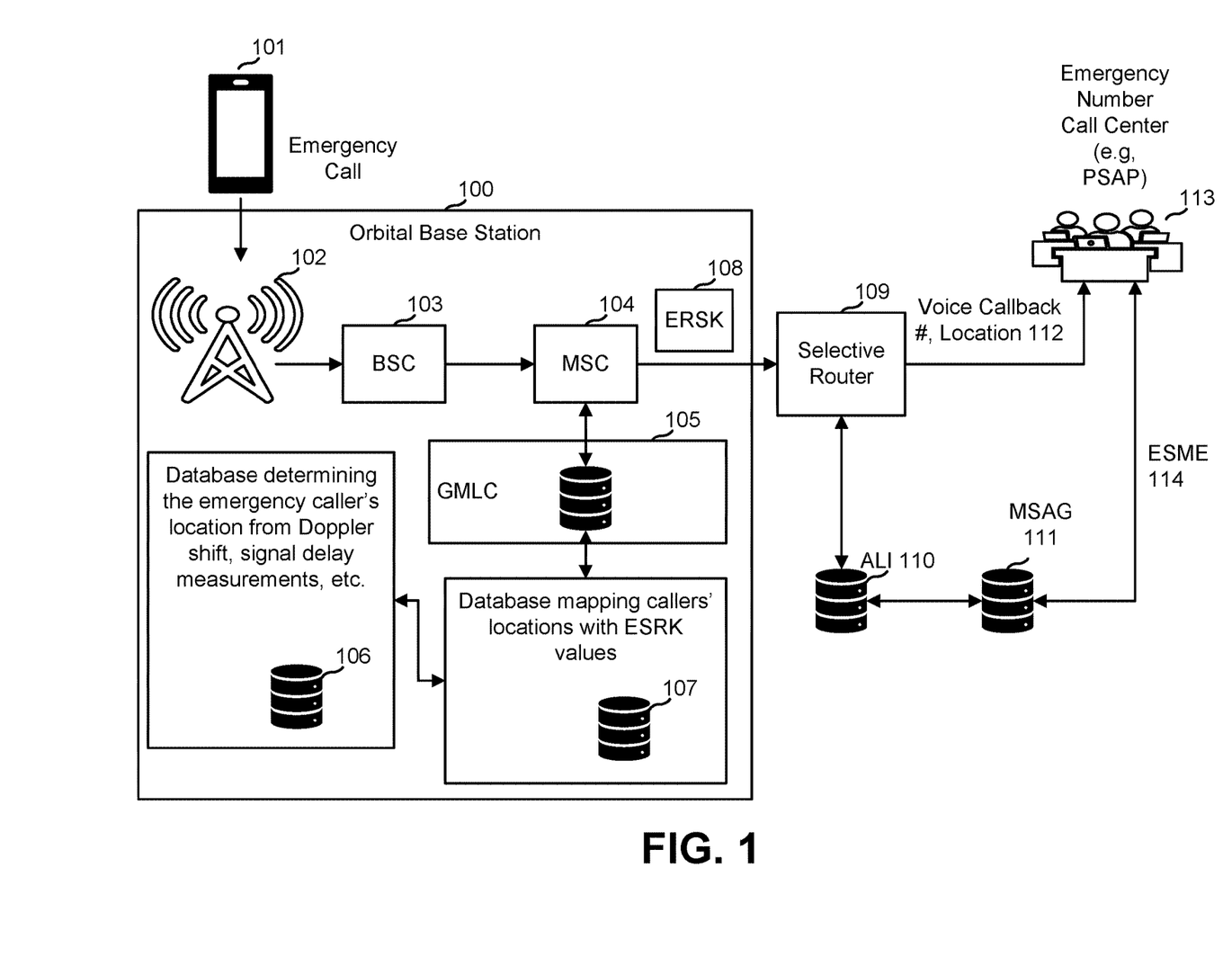
FIG. 1 is a block diagram of an emergency call system, according to various embodiments.

FIG. 1 is a block diagram of an emergency call system, according to various embodiments. As illustrated there, a subscriber device 101 might place an emergency call that is picked up by an orbital base station 100. Subscriber device 101 might be registered with a particular mobile network operator (MNO) and might include hardware and/or software to indicate such registration. One method is via the use of a SIM card (hardware containing a "subscriber identity module" or "subscriber identification module", or software, often referred to as an "e-SIM" providing that functionality. Methods described herein can be used with devices that are not subscriber devices and might not have an associated MNO. If subscriber device 101 is registered with a particular MNO, and subscriber device 101 include subscriber identification data with the emergency call, that data can be used to associate the call with a particular person or entity and also might be used to determine an address of residence or place of business associated with that subscriber. Such association might be obtained by submitting an electronic request to an MNO server that maintains a database of subscriber addresses and receiving a response from the MNO server indicating an address for the subscriber associated with subscriber device 101. Of course, such a location might be a fixed location where the subscriber receives postal mail and not necessarily a current location of subscriber device 101.

Subscriber device 101 might be a smartphone having communications and computation abilities, a limited feature cellular phone, an Internet-connected device, or other communication device. The emergency call might be a voice call, a text message, a data message, an app API call, or the like. In some instances, an emergency response begins with an emergency call initiated by the subscriber or other operator of subscriber device 101. In other instances, the emergency response begins without an explicit emergency call initiated by subscriber device 101, such as where first responders or others have determined that a person or system is in need of emergency response notwithstanding that no explicit emergency call was received. The geolocation for the emergency response, such as a destination to which first responders should be dispatched, could be an indication of a terrestrial latitude, terrestrial longitude, and terrestrial altitude, or some equivalent, or information with sufficient resolution to allow for dispatching emergency servicers to the device holder's location.

A dispatching system, such as a networked computer system used by a dispatcher such as a local public safety answering point or "PSAP" (in North America, this might be referred to as a "911 call center" and in other areas might be called a "999 emergency control center"; 112 in the European Union might also direct to a call center), receives the emergency call along with the data included with the emergency call. Where the emergency call is a voice call, the data might be provided separately to a PSAP operator and displayed while the PSAP operator handles the voice interaction with the subscriber or user. (While it is often the subscriber that is using the subscriber device, it should be understood that many of the operations described here work the same way regardless of the relationship between the user/holder of the device and a subscriber, but for clarity of exposition, the person or entity using the device and/or in need of emergency services is referred to as the subscriber associated with the subscriber device.)

In some public safety networks, there are multiple PSAPs and the public safety network might route an emergency call to a particular PSAP. This routing might be done based on information provided by MNOs and/or by data indicating particular terrestrial base stations that handled or are handling the emergency call. For example, the dispatch system might include a callback number for the subscriber, such as the cellular telephone number associated with the subscriber device, perhaps include as a "Caller-ID" message. In some public safety network systems, this first level of subscriber data, caller identification, is referred to as "Phase I data". Note that this first level of subscriber data would not by itself indicate a present location of subscriber device 101, but can provide information needed to call the subscriber back or located place of residence of the subscriber.

Some public safety networks may be able to determine estimated location information of subscriber device 101, such as based on what PSAP was selected or what terrestrial cellular network nodes were touched by the emergency call.

In some public safety network systems, this second level of subscriber data (caller identification and estimated location) is referred to as "Phase II data".

As illustrated in FIG. 1, orbital base station 100 receives the emergency call from subscriber device 101 as signals received by antenna 102 and passed to a base station controller (BSC) 103, which then processes the signals to form an emergency call message that is passed to a mobile switch center (MSC) 104. MSC 104 can draw from a location mapping database 106 that maps a geolocation of subscriber device 101 based on estimates determined from signals received by subscriber device 101. Orbital base station 100 populates location mapping database 106 based on characteristics of signals received from subscriber device 101, such as a Doppler shift and signal delay.

MSC 104 can use an emergency services routing key (ESRK) database 107 for mapping caller locations with ESRK values. Orbital base station 100 might include a Gateway Mobile Location Center (GMLC) 105 that might itself maintain GMLC data. Data in GMLC 105 might be similar to that of Table 1.

TABLE 1

| Tower ID | ESRK |
|---|---|
| Tower1 | 444-123-1111 |
| Tower2 | 444-123-1112 |
| Tower3 | 444-123-1113 |

In a typical terrestrial network, the data for the GMLC can be preloaded manually. For the orbital base station, ESRK database 107 can map locations to ESRK values instead of to tower identifiers. GMLC 105 might have a standard function and a standard interface to MSC 104 and ESRK database 107 can provide additional capabilities, such as capturing the orbital base station geolocation data.

Data in ESRK database 107 might me similar to that of Table 2.

TABLE 2

| Location | Distance from Location | ESRK | Primary PSAP to Route to |
|---|---|---|---|
| 37.82 N 84.91 W | 10 km | 444-123-1111 | 1 |
| 38.11 N 85.01 W | 9 km | 444-123-1112 | 2 |
| 39.22 N 86.2 W | 8 km | 444-123-1113 | 3 |

The data in ESRK database 107 can be preloaded based on areas served by the corresponding PSAP. However, the orbital base station might dynamically route to different PSAPs, or a centralized command center, in an event of failure of a primary PSAP. ESRK database 107 can be updated manually based on change of areas served by various PSAPs. With dynamic routing from the orbital base station, ESRK Database 107 may be constantly changing based on information known to the orbital base station regarding which PSAPs are operational.

Location mapping database 106 can be used needed for mapping Doppler shifts and delays to geolocations. When a mobile device initiates an emergency call, the orbital base station can use location mapping database 106 to determine a location of that mobile device and then can send a message from location mapping database 106 to ESRK database 107 to map that location with an ESRK. The ESRK is then sent to GMLC database 105, which can forward the ESRK value to MSC 104.

Using the information obtained from location mapping database 106, GMLC 105, and ESRK database 107, MSC 104 can generate an ESRK message 108 and send it to a selective router 109. Selective router 109 can then access an automatic location identifier (ALI) database 110, which in turn can access a master access street guide (MASG) database 111 to provide an External Short Messaging Entity (ESME) 114 message to a PSAP 113. Selective router 109 can also provide PSAP 113 with an emergency call dataset 112 that could include a voice call back number and location.

In the event of a PSAP failure due to a natural or manmade disaster or other requirement for 911 traffic management, orbital base station 100 can then route calls dynamically where the orbital base station 100 can decide which PSAP 113 to route the call to based on information known by orbital base station 100 as to which PSAPs are operational and can handle emergency calls.

An ESRK might be a parameter, such as a ten-digit number. Selective router 109 can route calls based on an ESRK and decide on which PSAP to route to. ALI database 110 might include data for automatic location identifiers. MASG database 111 might include data related a master access street guide. ALI database 110 and MSAG database 111 can be used by a PSAP to determine the location of the mobile device.

Figure 2:
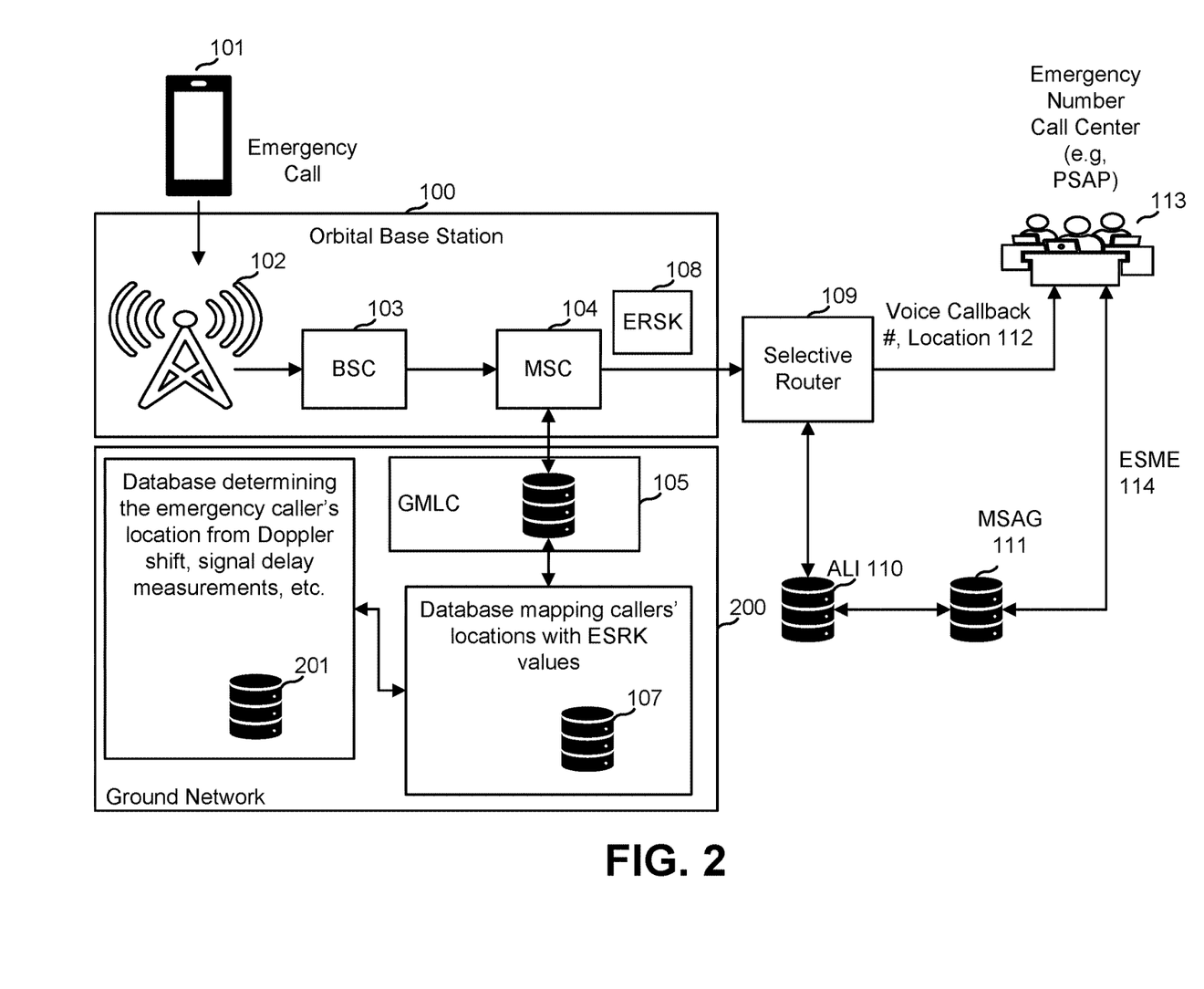
FIG. 2 is a block diagram of an emergency call system with portions handled by a ground network station, according to various embodiments.

FIG. 2 is a block diagram of an emergency call system with portions handled by a ground network station, according to various embodiments. Many elements can be similar to what is shown in FIG. 1, but in this embodiment, a ground network 200 implements a location mapping database 200 similar to location mapping database 106, and also implements GMLC 105 and ESRK database 107 and sends messages to MSC 104 as needed. MSK 104 might query GMLC 105 with an ID of the mobile device, which GMLC 105 might respond back with an ESRK value.

Figure 3:
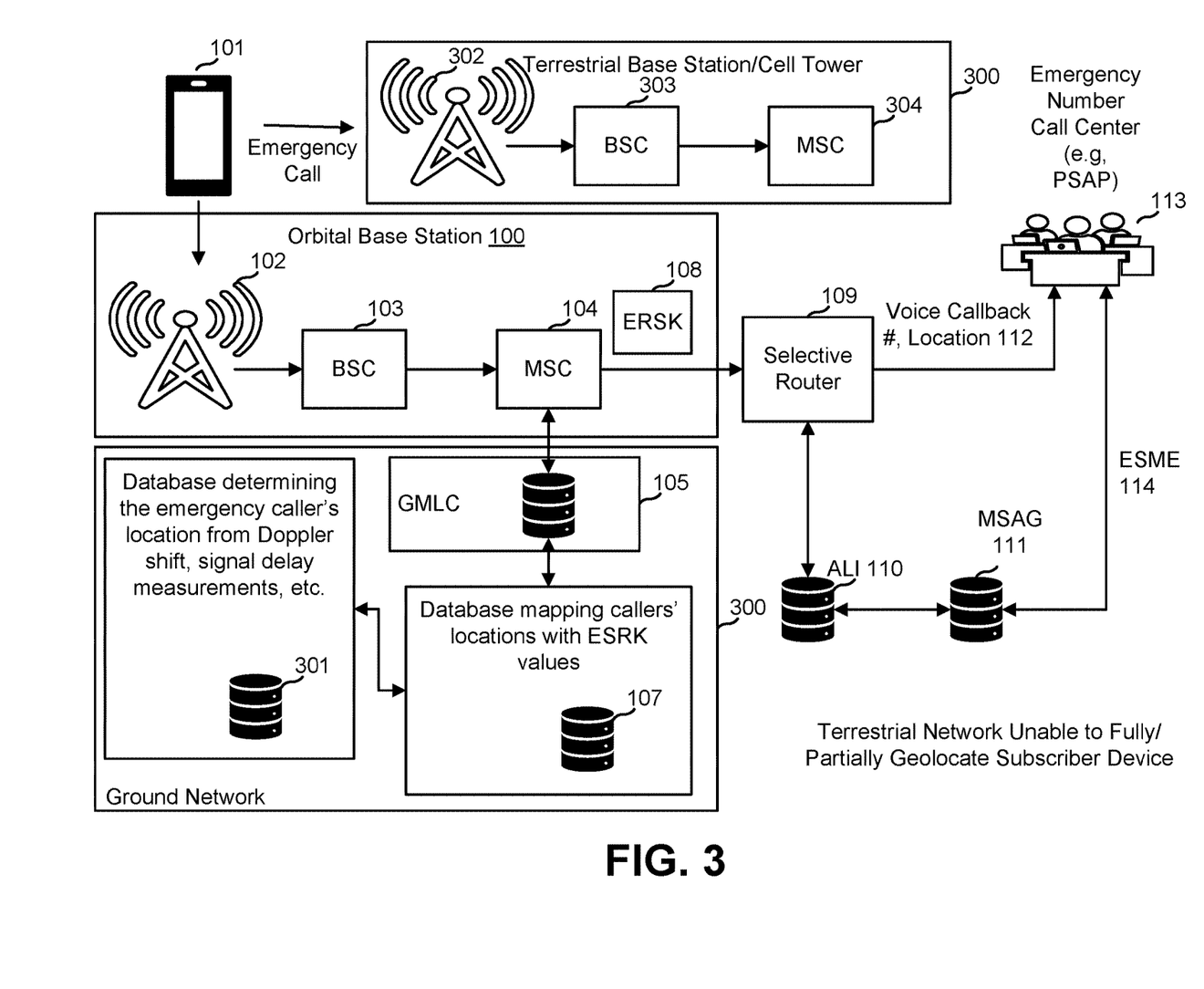
FIG. 3 is a block diagram of an emergency call system illustrating terrestrial base station failure, according to various embodiments.

FIG. 3 is a block diagram of an emergency call system illustrating terrestrial base station failure, according to various embodiments. As shown there, a location mapping database 301 is used in a ground network 300. Also shown there, the emergency call might be picked up by an antenna 302 of a terrestrial base station 300 having its own BSC 303 and MSC 304. Where the terrestrial network and/or terrestrial base station 300 is unable to provide location information for subscriber device 101 orbital base station 100 can be used to provide that information.

Speidel I includes a disclosure of a space-based cellular network that handles the Doppler shift and propagation delay between a 3GPP-compliant orbital base station and user terminal (e.g., smartphone, feature phone, etc.) on the surface of the Earth. Based on the handling of these link parameters (e.g., Doppler shift and time delay), the orbital base station can locate the position of the mobile phones it communicates with more accuracy than a terrestrial base station, which can only use the time delay to compute the distance between the user and the tower, as opposed to a vector which describes a distance and direction relative to the tower.

The location of a mobile device or a machine can be determined using space-based cell towers where the space-based cell towers compensate for Doppler shift and time delay. Examples are described in Speidel IV. The Doppler shift and time delay of the air interface link between a satellite and a mobile device on the surface of the Earth vary depending on the location of the mobile device or the machine relative to the satellite's position and velocity vector. The disclosure assumes that the satellite positions and velocities are known relatively accurately, which can be accomplished using GPS receivers on the satellites or signal-ranging measurements taken from ground stations on Earth (which have an accurately known GPS location). With state vector knowledge of where the satellites are in their orbits (position, velocity, etc.) and state vector knowledge of where the user equipment is relative to the satellite, the absolute location of the user equipment can be computed by the satellite that is communicating with it.

A database could be created to either determine the mobile device location from Doppler shift and signal time delay measurements or determine a time history of Doppler shift and signal time delay measurements, as a result of the mobile device either using space-based cell towers or even using a terrestrial cell tower to call or text an emergency number (where the space-based cell tower sniff the signals).

Orbital base stations can accurately identify the locations of devices on the surface of a planetary body (Earth, Moon, Mars, etc.) without the need to use alternative position-navigation and timing systems (e.g., GPS). One or more databases, which could be located on a satellite housing the orbital base station or integrated into a ground network, could be created that map locations of mobile devices to respective ESRK values. A computer system might manage the database and interface with a GMLC that interfaces with an MSC to send an ESRK message with an ESRK value with an emergency call.

In a particular embodiment, the database might map latitudes and longitudes to ESRK values and the GMLC database maps towers to ESRK values.

Location routing information generated from orbital base station 100 could be used as Phase Three data to calculate a confidence level of prediction ("COP" value). When a dispatch system receives an emergency call, a user interface used by an emergency operator might display the COP value for a received emergency call. The dispatch system might send a query to an MNO server with received ESRK values and available subscriber information and the MNO server might respond with location data (e.g., "Phase I Data") including a latitude and a longitude of a terrestrial base station that handled the emergency call. The dispatch system and might use additional information (e.g., "Phase II Data") to determine a street address deemed closest to an estimated location of subscriber device 101 and a COP value. Using this information, a dispatch system can rely on orbital base stations to fill in when terrestrial base stations are compromised or unavailable.

Phase III data can comprise location data of mobile devices determined by an orbital base station from signal characteristics, such as Doppler shift and signal delay, and this can be exploited to route calls to mutual aid PSAPs or a centralized National Operations Center (NOC). In the event of a PSAP 113 failure, orbital base station 100 can then route calls dynamically where orbital base station 100 can decide to route a call to another PSAP based on information known by orbital base station 100 on which PSAP 113 is operational and can handle emergency calls. A PSAP might be used to handle emergency calls while NOC might be set up as a centralized command post to execute an overall response for a given disaster.

The orbital base station location data can be combined with geolocation data from a conventional terrestrial network. A first type of geolocation data is determined by receiving a subscriber telephone number with the emergency call and using a subscriber database, as might be maintained by a mobile network operator that has the subscriber as a customer.

A database could be created to log computations of a mobile device location based on the Doppler shift and time delay measurements, or even a time history of these measurements, or measurements of Doppler shift and time delay taken from various satellites in different orbits. Furthermore, as the mobile device moves, additional measurements allow knowledge of its motion to be tracked by the satellite network, updating its location accordingly based on variations in its Doppler shift and delay measurements. The database can be located on the satellite or the ground. The orbital base station can also be used to update existing geolocation data and provide an improved COP value.

In the case of a mobile device located outside of terrestrial mobile coverage, the location determined from measurements on the air interface link can route an emergency call to an appropriate emergency number call center (e.g., PSAP). The terrain of the user's location (such as altitude and surroundings) can be computed/determined using direct measurement of signal properties and can be augmented with high fidelity altitude contour maps of the Earth. The derived terrain can assist in certain emergency response scenarios where terrain directly informs emergency asset deployment strategy.

An orbital base station or ground network might be configured to map mobile device locations to ESRK values to create a database. An ESRK module might use that database and messaging with a GMLC that interfaces with an MSC to send an ESRK value with an emergency call and route emergency calls to appropriate emergency number call centers.

In the case of a mobile device located within terrestrial mobile coverage, an orbital base station might determine the mobile device's location based on compensating for Doppler shift and time delay. This can be achieved when the mobile phone has more than one SIM card and/or eSIM where one of the SIM cards and/or eSIM can be used to communicate with the orbital base station. The mobile device's location can then be shared with terrestrial mobile networks and be used to route calls to the appropriate emergency number call center.

As one example, a mobile device within terrestrial mobile coverage may send an emergency text, but the terrestrial network concludes that it needs better location information, or the location information validated. If the mobile device is not currently using spectrum covered by the orbital base stations, the terrestrial network could tell the mobile device to communicate on channels and/or frequencies used by an orbital base station network and request that its location be identified and then sent to the terrestrial network.

The location and time registration of the emergency caller's device on the last known mobile tower could be used to verify the potential location of the user. The orbital base station geolocation value can be used to estimate or resolve the location in the event that Phase I data and Phase II data are showing different locations and/or Phase I and/or Phase II data are not available.

In the case of the terrestrial network not locating the emergency caller by having the emergency caller's device send its GPS location to the emergency call center and locating the emergency caller using an orbital base station network. In this case, the phone may send its GPS location using either the terrestrial network, the orbital base station network, or both. This can mitigate the risk of not locating the emergency caller's device.

The orbital base station network can be backward and forward compatible with various generations of local public safety answering systems, such as the examples described above and shown in FIG. 2. Forward compatibility can be provided by using existing NG-911 protocols, directly feeding location information to route an emergency call to an appropriate emergency call center.

In future handsets, such as improved smartphone technology, applications might automatically send the handset's location via an SOS call or otherwise. In emergency scenarios, similar to how locked smartphones can be used to dial 911 without a password, mobile devices might be configured to allow a user to send an SOS beacon from a locked smartphone without requiring entry of a password. This could be particularly useful in scenarios where voice communications are unavailable, or a user is more technically capable of sending a message than making a phone call, such as being out at sea. The SOS beacon might be useful in situations where the user notifies emergency responders that they may not be able to conduct a voice call or immediately respond. The handsets may be enhanced to communicate what they are capable of at that particular moment, which may be only an SMS, voice call, or video call, indicating to responders the correct or preferred way to interact with the person in an emergency.

The systems described herein can be applied for calls to emergency numbers from a mobile phone or machine, as well as texts and other types of communications to emergency numbers from a mobile phone or machine. The systems described herein can be used for communications from a mobile phone or machine that requires location and timing information of the mobile phone or machine. Aside from emergency uses, the systems described herein can be used for asset tracking purposes, future emergency communications infrastructure such as NG-911, and/or for future voice communications technologies such as VoLTE.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for an application on a mobile device to automatically send a mobile device location of the mobile device to a terrestrial network via an SOS call, the method comprising:
   determining the mobile device location, using Doppler shift and signal time delay measurements from an orbital base station and corresponding compensation; and
   in response to a terrestrial network determining that geolocation information available to the terrestrial network has a reliability below a predetermined reliability threshold, sending a GPS location to an emergency call center from the mobile device.

2. The method of claim 1, wherein sending the GPS location to the emergency call center is via the orbital base station.

3. The method of claim 1, wherein sending the GPS location to the emergency call center is via both the orbital base station and a terrestrial base station.

4. The method of claim 1, wherein the mobile device is a locked mobile device.

5. The method of claim 1, further comprising sending an indication of a preferred and/or viable communication type to emergency responders.

6. The method of claim 1, further comprising:
determining an orbital base station location of the orbital base station; and
computing a geolocation of the mobile device based on the Doppler shift, the signal time delay, and the orbital base station location.

7. The method of claim 1, wherein the mobile device is one or more of a mobile telephone, a machine, or a network-connected device.

8. The method of claim 1, wherein the SOS call is one or more of a voice call, a video call, a text message, or a data message.

9. The method of claim 1, wherein the SOS call is according to a 2G, 3G, 4G, and/or 5G protocol.

10. The method of claim 1, wherein the SOS call is routed to an emergency call center from among a plurality of emergency call centers with routing being based on a telephone number assigned to the mobile device or a network address assigned to the mobile device.

11. The method of claim 1, wherein routing of the SOS call is based on a determined latitude and longitude for the mobile device.

12. The method of claim 1, wherein routing of the SOS call is based on a last known street address associated with the mobile device.

13. The method of claim 1, wherein the mobile device location is derived from current states of the mobile device.

14. The method of claim 1, wherein the mobile device location is derived from a time history of states of the mobile device.

15. The method of claim 1, further comprising:
storing the mobile device location;
mapping the mobile device location with an Emergency Services Routing Key (ESRK) value;
storing the mobile device location with the ESRK value; and
using the ESRK value to route the SOS call to a Public Safety Answering Point (PSAP).

16. The method of claim 15, wherein the storing is performed at the orbital base station.

17. The method of claim 15, wherein the storing is performed at a ground network station.

18. The method of claim 15, wherein the storing is performed at a ground network station and at the orbital base station.

19. The method of claim 1, further comprising:
transmitting a computed location of the mobile device from the orbital base station to a terrestrial mobile network or emergency call center.

20. The method of claim 1, wherein the mobile device includes more than one subscriber identifier module (SIM) card, the method further comprising selecting one selected SIM card for communication with the orbital base station.

21. The method of claim 20, wherein at least one of the SIM cards is an electronic SIM card.

* * * * *

UNITED STATES PATENT AND TRADEMARK OFFICE
CERTIFICATE OF CORRECTION

PATENT NO. : 12,389,213 B1
APPLICATION NO. : 17/689893
DATED : August 12, 2025
INVENTOR(S) : Margo Ruth Deckard et al.

It is certified that error appears in the above-identified patent and that said Letters Patent is hereby corrected as shown below:

In the Specification

Column 1, Lines 25-29, change:
"4) U.S. Non-Provisional patent application Ser. No. 17/570,329 filed Jan. 6, 2022, entitled "Satellite Communication System Transmitting Navigation Signals Using a Wide Beam and Data Signals Using a Directive Beam" (hereinafter "Speidel III")."
To:
--3) U.S. Non-Provisional patent application Ser. No. 17/570,329 filed Jan. 6, 2022, entitled "Satellite Communication System Transmitting Navigation Signals Using a Wide Beam and Data Signals Using a Directive Beam" (hereinafter "Speidel III").--

Column 3, Lines 47-52, change:
"Speidel IV describes some methods of using a constellation of satellites to provide simultaneous communications services and GNSS services that might be used for as part of a process for geolocating a mobile device from which an emergency call is being made and that might be used in combination with methods and apparatus described herein."
To:
--Speidel III describes some methods of using a constellation of satellites to provide simultaneous communications services and GNSS services that might be used for as part of a process for geolocating a mobile device from which an emergency call is being made and that might be used in combination with methods and apparatus described herein.--

Columns 6-7, Lines 59-67 and 1-9, respectively, change:
"The location of a mobile device or a machine can be determined using space-based cell towers where the space-based cell towers compensate for Doppler shift and time delay. Examples are described in Speidel IV. The Doppler shift and time delay of the air interface link between a satellite and a mobile device on the surface of the Earth vary depending on the location of the mobile device or the machine relative to the satellite's position and velocity vector. The disclosure assumes that the satellite interface link between a satellite and a mobile device on the surface of the Earth vary depending on the location of the mobile device or the machine relative to the satellite's position and velocity vector. The Signed and Sealed this
Thirtieth Day of September, 2025

John A. Squires
*Director of the United States Patent and Trademark Office* disclosure assumes that the satellite positions and velocities are known relatively accurately, which can be accomplished using GPS receivers on the satellites or signal-ranging measurements taken from ground stations on Earth (which have an accurately known GPS location). With state vector knowledge of where the satellites are in their orbits (position, velocity, etc.) and state vector knowledge of where the user equipment is relative to the satellite, the absolute location of the user equipment can be computed by the satellite that is communicating with it."

To:

--The location of a mobile device or a machine can be determined using space-based cell towers where the space-based cell towers compensate for Doppler shift and time delay. Examples are described in Speidel III. The Doppler shift and time delay of the air interface link between a satellite and a mobile device on the surface of the Earth vary depending on the location of the mobile device or the machine relative to the satellite's position and velocity vector. The disclosure assumes that the satellite positions and velocities are known relatively accurately, which can be accomplished using GPS receivers on the satellites or signal-ranging measurements taken from ground stations on Earth (which have an accurately known GPS location). With state vector knowledge of where the satellites are in their orbits (position, velocity, etc.) and state vector knowledge of where the user equipment is relative to the satellite, the absolute location of the user equipment can be computed by the satellite that is communicating with it.--